United States Patent
Miyazawa

(10) Patent No.: US 10,493,619 B2
(45) Date of Patent: Dec. 3, 2019

(54) PIEZOELECTRIC DRIVE DEVICE AND ROBOT

(71) Applicant: Seiko Epson Corporation, Tokyo (JP)

(72) Inventor: Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 471 days.

(21) Appl. No.: 15/196,424

(22) Filed: Jun. 29, 2016

(65) Prior Publication Data

US 2017/0012605 A1    Jan. 12, 2017

(30) Foreign Application Priority Data

Jul. 7, 2015 (JP) .................................. 2015-135776

(51) Int. Cl.
*B25J 9/12* (2006.01)

(52) U.S. Cl.
CPC ...................................... *B25J 9/12* (2013.01)

(58) Field of Classification Search
CPC .......... H02N 2/00; H02N 2/103; H02N 2/026; H02N 2/001; H02N 2/0015; H02N 2/002; H02N 2/003; H02N 2/0045; H02N 2/046; B06B 1/0603; B25J 9/12
USPC ................... 310/323.02, 323.12, 323.18, 328
See application file for complete search history.

(56) References Cited

U.S. PATENT DOCUMENTS

| | | | | |
|---|---|---|---|---|
| 6,831,393 B2 * | 12/2004 | Miyazawa | ............. | H02N 2/004 310/12.01 |
| 6,885,615 B1 * | 4/2005 | Miyazawa | .......... | H01L 41/0913 310/323.01 |
| 6,909,223 B2 * | 6/2005 | Miyazawa | ............. | H02N 2/004 310/15 |
| 7,078,847 B2 * | 7/2006 | Miyazawa | .......... | H01L 41/0913 310/323.02 |
| 7,116,038 B2 * | 10/2006 | Miyazawa | ............. | G02B 26/02 310/323.02 |
| 7,157,834 B2 * | 1/2007 | Miyazawa | ............. | H02N 2/004 310/323.01 |
| 7,193,353 B2 * | 3/2007 | Miyazawa | ............. | H02N 2/004 310/328 |
| 7,224,102 B2 * | 5/2007 | Miyazawa | ............. | H02N 2/004 310/323.02 |
| 7,253,552 B2 * | 8/2007 | Miyazawa | .......... | H01L 41/0913 310/323.02 |
| 7,564,173 B2 * | 7/2009 | Namerikawa | ....... | H01L 41/0471 310/328 |
| 7,737,604 B2 * | 6/2010 | Adachi | .................. | H02N 2/028 310/316.01 |
| 9,050,828 B2 * | 6/2015 | Miyazawa | ................. | B25J 5/00 |

(Continued)

FOREIGN PATENT DOCUMENTS

| | | |
|---|---|---|
| CN | 102292907 A | 12/2011 |
| CN | 103368455 A | 10/2013 |

(Continued)

*Primary Examiner* — Victor L MacArthur
(74) *Attorney, Agent, or Firm* — Harness, Dickey & Pierce, P.L.C.

(57) ABSTRACT

A piezoelectric drive device includes a plurality of piezoelectric vibrating portions that drive a driven member. A difference between the maximum resonance frequency and the minimum resonance frequency in each resonance frequency of the plurality of piezoelectric vibrating portions falls within a range of 0.001% to 5% of an average resonance frequency of the plurality of piezoelectric vibrating portions.

9 Claims, 12 Drawing Sheets

(56) References Cited

U.S. PATENT DOCUMENTS

| | | | |
|---|---|---|---|
| 9,248,575 B2 * | 2/2016 | Miyazawa | B25J 15/0009 |
| 9,334,935 B2 * | 5/2016 | Nishimura | H01L 41/0913 |
| 2004/0256956 A1 * | 12/2004 | Miyazawa | H02N 2/004 |
| | | | 310/328 |
| 2004/0256957 A1 * | 12/2004 | Miyazawa | H02N 2/004 |
| | | | 310/328 |
| 2005/0212386 A1 * | 9/2005 | Miyazawa | H02N 2/004 |
| | | | 310/328 |
| 2005/0285481 A1 * | 12/2005 | Miyazawa | H02N 2/004 |
| | | | 310/328 |
| 2006/0226737 A1 * | 10/2006 | Miyazawa | H01L 41/0913 |
| | | | 310/323.02 |
| 2007/0012818 A1 * | 1/2007 | Miyazawa | A63H 27/12 |
| | | | 244/17.25 |
| 2007/0228875 A1 * | 10/2007 | Miyazawa | H02N 2/004 |
| | | | 310/317 |
| 2008/0048526 A1 * | 2/2008 | Namerikawa | H01L 41/0471 |
| | | | 310/323.02 |
| 2009/0128063 A1 * | 5/2009 | Miyazawa | H02P 25/032 |
| | | | 318/3 |
| 2009/0160291 A1 * | 6/2009 | Miyazawa | H02N 2/004 |
| | | | 310/317 |
| 2009/0224630 A1 * | 9/2009 | Adachi | H02N 2/008 |
| | | | 310/317 |
| 2010/0156239 A1 | 6/2010 | Petrenko et al. | |
| 2013/0049536 A1 | 2/2013 | Petrenko et al. | |
| 2013/0141564 A1 * | 6/2013 | Miyazawa | H01L 41/09 |
| | | | 348/126 |
| 2013/0255427 A1 | 10/2013 | Mizushima et al. | |
| 2013/0328967 A1 * | 12/2013 | Miyazawa | B25J 5/00 |
| | | | 347/37 |
| 2013/0330153 A1 * | 12/2013 | Nishimura | H01L 41/0913 |
| | | | 414/222.01 |
| 2014/0026686 A1 * | 1/2014 | Bashir | G01G 19/14 |
| | | | 73/865 |
| 2015/0318801 A1 * | 11/2015 | Kamijo | H02N 2/0075 |
| | | | 310/323.02 |

FOREIGN PATENT DOCUMENTS

| | | |
|---|---|---|
| JP | 2001-112274 A | 4/2001 |
| JP | 2003-333872 A | 11/2003 |
| JP | 2010-016978 A | 1/2010 |
| JP | 2013-009596 A | 1/2013 |

* cited by examiner

PIEZOELECTRIC DRIVE DEVICE AND ROBOT

BACKGROUND

1. Technical Field

The present invention relates to a piezoelectric drive device and a robot.

2. Related Art

A piezoelectric actuator (piezoelectric drive device) which causes a piezoelectric element to vibrate a vibrating body so as to drive a driven body (driven member) has been used in controlling various operations for various devices. For example, JP-A-2010-16978 discloses that a frequency within a frequency range in which respective drivable frequencies overlap each other is employed as a simultaneous drive frequency, in a case where a plurality of ultrasonic motors (piezoelectric actuators) having respectively different resonance frequencies are simultaneously driven.

If a resonance frequency of a piezoelectric actuator is likely to be deviated due to a load or temperature change and the resonance frequency is deviated, a drive characteristic (an impedance characteristic, an amplitude characteristic, or the like) is unavoidably deviated in a drive frequency (normally, set to be the resonance frequency or to be in the vicinity of the resonance frequency) of the piezoelectric actuator. In addition, if a vibrating body is configured to include a member having less damage, a mechanical quality factor (Qm) of the vibrating body increases, and a Q-value (quantity representing resonance sharpness) increases consequently. Accordingly, the drive characteristic varies greatly in the drive frequency due to the deviated resonance frequency. For example, in a case where a substrate made of silicon (Si) is used as the vibrating body, the Q-value tends to increase. Thus, the substrate tends to considerably receive the influence of the varied drive characteristic. Furthermore, in a case where a plurality of piezoelectric actuators are simultaneously driven, respective resonance frequencies are less likely to be coincident with each other, and the respective drive characteristics are less likely to be aligned with each other. Therefore, in order to drive a driven unit by using the plurality of piezoelectric actuators having respectively different resonance frequencies, it is desirable to restrain the influence of the varied drive characteristic.

JP-A-2010-16978 has no consideration of an issue that the drive characteristic of the respective actuators is unavoidably varied in the drive frequency due to the respectively deviated resonance frequencies resulting from a load or temperature change.

SUMMARY

An advantage of some aspects of the invention is to solve at least a part of the problems described above, and the invention can be implemented as the following aspects or application examples.

(1) According to an aspect of the invention, a piezoelectric drive device is provided. The piezoelectric drive device includes a plurality of piezoelectric vibrating portions that drive a driven member. A difference between the maximum resonance frequency and the minimum resonance frequency in each resonance frequency of the plurality of piezoelectric vibrating portions falls within a range of 0.001% to 5% of an average resonance frequency of the plurality of piezoelectric vibrating portions.

According to this aspect, the driven member is driven by the plurality of piezoelectric vibrating portions in which the difference between the maximum resonance frequency and the minimum resonance frequency in each resonance frequency of the plurality of piezoelectric vibrating portions falls within the range of 0.001% to 5% of the average resonance frequency. In this case, respective frequency characteristics of the plurality of piezoelectric vibrating portions, for example, impedance characteristics are superimposed on each other. In this manner, it is possible to minimize an impedance change (change rate) with respect to a frequency change in the impedance characteristics of the overall piezoelectric drive device which drives the driven member. It is possible to restrain variations in a drive characteristic in which the piezoelectric drive device drives the driven member, and it is possible to improve drive efficiency.

(2) In the piezoelectric drive device according to the aspect, the difference between the maximum resonance frequency and the minimum resonance frequency may fall within a range of 0.003% to 5% of the average resonance frequency.

According to the aspect with this configuration, the driven member is driven by the plurality of piezoelectric vibrating portions in which the difference between the maximum resonance frequency and the minimum resonance frequency in each resonance frequency of the plurality of piezoelectric vibrating portions falls within the range of 0.003% to 5% of the average resonance frequency. In this manner, it is possible to restrain variations in a drive characteristic in which the piezoelectric drive device drives the driven member, and it is possible to improve drive efficiency.

(3) In the piezoelectric drive device according to the aspect, the difference between the maximum resonance frequency and the minimum resonance frequency may fall within a range of 0.1% to 5% of the average resonance frequency.

According to the aspect with this configuration, the driven member is driven by the plurality of piezoelectric vibrating portions in which the difference between the maximum resonance frequency and the minimum resonance frequency in each resonance frequency of the plurality of piezoelectric vibrating portions falls within the range of 0.1% to 5% of the average resonance frequency. In this manner, it is possible to restrain variations in a drive characteristic in which the piezoelectric drive device drives the driven member, and it is possible to improve drive efficiency.

(4) In the piezoelectric drive device according to the aspect, the difference between the maximum resonance frequency and the minimum resonance frequency may fall within a range of being greater than 1% and equal to or smaller than 5% of the average resonance frequency.

According to the aspect with this configuration, the driven member is driven by the plurality of piezoelectric vibrating portions in which the difference between the maximum resonance frequency and the minimum resonance frequency in each resonance frequency of the plurality of piezoelectric vibrating portions falls within the range of being greater than 1% and equal to or smaller than 5% of the average resonance frequency. In this manner, it is possible to restrain variations in a drive characteristic in which the piezoelectric drive device drives the driven member, and it is possible to improve drive efficiency.

(5) In the piezoelectric drive device of the aspect, the plurality of piezoelectric vibrating portions may be integrally formed as one piezoelectric vibrating unit.

According to the aspect with this configuration, the plurality of piezoelectric vibrating portions configuring one piezoelectric vibrating unit are integrally formed. Accordingly, the respective frequency characteristics, for example, the impedance characteristics are superimposed on each other, thereby improving a synthesized effect. Therefore, it is possible to more effectively minimize an impedance change (change rate) with respect to a frequency change in the impedance characteristics of the overall piezoelectric drive device. It is possible to more effectively restrain variations in the drive characteristic in which the piezoelectric drive device drives the driven member, and it is possible to improve drive efficiency.

(6) The piezoelectric drive device according to the aspect may further include a plurality of piezoelectric vibrating units that drive the driven member. In each of the plurality of piezoelectric vibrating units, at least two piezoelectric vibrating portions in the plurality of piezoelectric vibrating portions may be integrated.

According to the aspect with this configuration, it is possible to more effectively minimize the impedance change (change rate) with respect to the frequency change in the frequency characteristic, for example, the impedance characteristic, in the piezoelectric vibrating unit in which the plurality of piezoelectric vibrating portions are integrally formed. It is possible to effectively restrain variations in the drive characteristic in which the piezoelectric drive unit drives the driven member. In addition, the respective impedance characteristics of the plurality of piezoelectric vibrating units are superimposed on each other. In this manner, it is possible to minimize an impedance change (change rate) with respect to a frequency change in the impedance characteristics of the overall piezoelectric drive device. It is possible to restrain variations in a drive characteristic in which the piezoelectric drive device drives the driven member, and it is possible to improve drive efficiency.

(7) In the piezoelectric drive device according to the aspect, the piezoelectric vibrating portion may include a vibrating plate, a piezoelectric element which has a first electrode, a second electrode, and a piezoelectric substance located between the first electrode and the second electrode, and which is disposed in the vibrating plate, and a contact portion which is disposed in at least one of the vibrating plate and the piezoelectric element, and which can come into contact with the driven member.

(8) In the piezoelectric drive device according to the aspect, a thickness of the piezoelectric substance may be from 50 nm to 20 μm. According to this configuration, it is possible to realize a thin and miniaturized piezoelectric drive device.

The invention can be implemented in various forms. For example, in addition to the piezoelectric drive device, the invention can be implemented in various forms such as a method for driving the piezoelectric drive device, a robot equipped with the piezoelectric drive device, a method for driving the robot equipped with the piezoelectric drive device, an electronic component conveying device, a liquid feeding pump, a drug dispensing pump, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
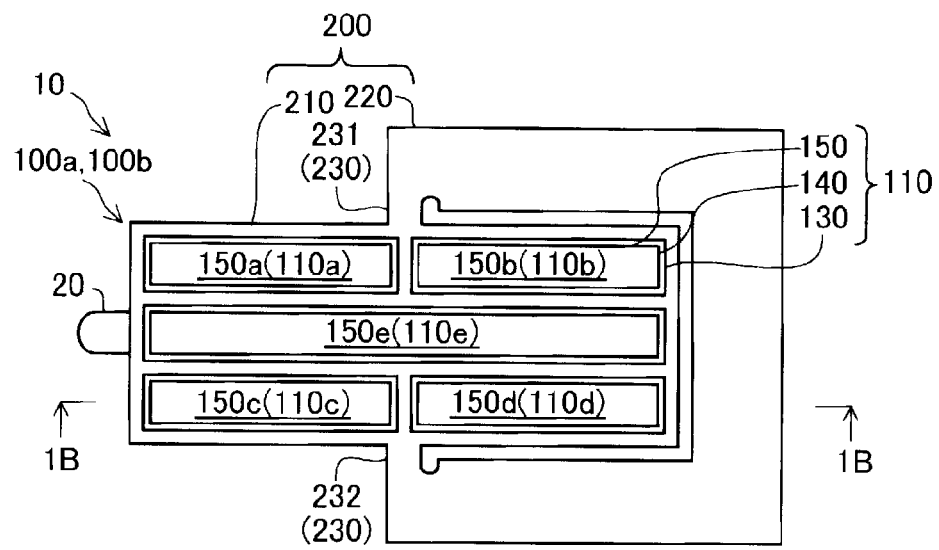
FIGS. 1A and 1B are schematic configuration diagrams of a piezoelectric drive device according to a first embodiment.
Figure 1B:
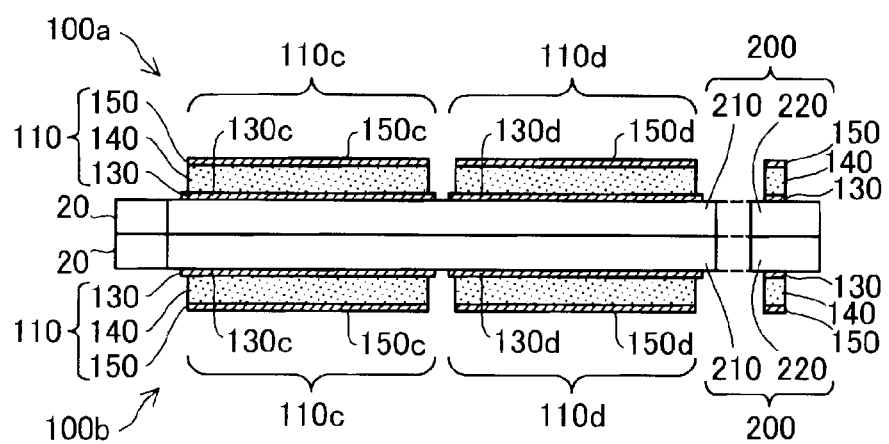

A. First Embodiment:

FIG. 1A is a schematic plan view of a piezoelectric drive device 10 according to a first embodiment. FIG. 1B is a sectional view taken along line 1B-1B in FIG. 1A. The piezoelectric drive device 10 includes a plurality of piezoelectric vibrating portions 100. FIGS. 1A and 1B illustrate a configuration example including two piezoelectric vibrating portions 100a and 100b. The piezoelectric vibrating portions 100a and 100b respectively have the same configuration including a substrate 200 and a piezoelectric element 110 formed on the substrate 200. The piezoelectric drive device 10 is configured to include a unit (also referred to as a "piezoelectric vibrating unit") in which the respective substrates 200 of the piezoelectric vibrating portion 100a and 100b are integrally formed while facing each other and being joined using an adhesive (not illustrated). Hereinafter, the piezoelectric vibrating portions 100a and 100b will be simply referred to as the "piezoelectric vibrating portion 100", except for a case where description is made so as to distinguish the piezoelectric vibrating portions 100a and 100b from each other.

The substrate 200 of the piezoelectric vibrating portion 100 includes a vibrating body 210, a fixing portion 220, and a connection portion 230 (a first connection portion 231 and a second connection portion 232) for connecting the vibrating body 210 and the fixing portion 220. The fixing portion 220 and the connection portion 230 are also collectively referred to as a "support portion". The piezoelectric element 110 is formed on an insulating layer 260 on the vibrating body 210.

The piezoelectric element 110 includes a first electrode 130, a piezoelectric substance 140 formed on the first electrode 130, and a second electrode 150 formed on the piezoelectric substance 140. The first electrode 130 and the second electrode 150 interpose the piezoelectric substance 140 therebetween. For example, the first electrode 130 or the second electrode 150 is a thin film formed by means of sputtering. For example, as a material of the first electrode 130 or the second electrode 150, it is possible to use any desired highly conductive material such as aluminum (Al), nickel (Ni), gold (Au), platinum (Pt), iridium (Ir), copper (Cu), and the like.

For example, the piezoelectric substance 140 is formed by using a sol-gel method or a sputtering method, and has a thin film shape. As a material of the piezoelectric substance 140, it is possible to use any desired material showing a piezoelectric effect, such as ceramics employing a perovskite structure of $ABO_3$ type. For example, as the ceramics employing the perovskite structure of $ABO_3$ type, it is possible to use lead zirconate titanate (PZT), barium titanate, lead titanate, potassium niobate, lithium niobate, lithium tantalate, sodium tungstate, zinc oxide, titanate barium strontium (BST), strontium bismuth tantalate (SBT), lead metaniobate, lead zinc niobate, scandium lead niobate, and the like. In addition, it is also possible to use a material showing the piezoelectric effect in addition to the ceramics, for example, such as polyvinylidene fluoride, quartz, and the like. For example, it is preferable that a thickness of the piezoelectric substance 140 falls within a range of 50 nm (0.05 µm) to 20 µm. It is possible to easily form a thin film of the piezoelectric substance 140 having the thickness of this range by utilizing a film forming process (also referred to as a "deposition process"). If the thickness of piezoelectric substance 140 is 0.05 µm or greater, it is possible to generate a sufficiently great force in accordance with the expansion and contraction of the piezoelectric substance 140. In addition, if the thickness of piezoelectric substance 140 is equal to or smaller than 20 µm, the piezoelectric vibrating portion 100 can be sufficiently miniaturized.

In the present embodiment, the piezoelectric vibrating portion 100 includes five piezoelectric elements 110a, 110b, 110c, 110d, and 110e, as the piezoelectric element 110. The piezoelectric element 110e is formed in a substantially rectangular shape, and is formed at the center in a width direction of the vibrating body 210 along a longitudinal direction of the vibrating body 210. The four piezoelectric elements 110a, 110b, 110c, and 110d are formed at a position of four corners of the vibrating body 210. The four piezoelectric elements 110a, 110b, 110c, and 110d are divided into a pair of the piezoelectric elements 110a and 110d located at a first opposite angle and a pair of the piezoelectric elements 110b and 110c located at a second opposite angle. These have a positional relationship of being laterally symmetrical to each other around the piezoelectric element 110e at the center. Hereinafter, a pair of the piezoelectric elements 110a and 110d are referred to as a "first piezoelectric element", and the other pair of the piezoelectric elements 110b and 110c are referred to as a "second piezoelectric element". In addition, the piezoelectric element 110e at the center is referred to as a "third piezoelectric element". In accordance with the respective piezoelectric elements 110a, 110b, 110c, and 110d, the first electrode 130 and the second electrode 150 are divided into five first electrodes 130a, 130b, 130c, 130d, and 130e and five second electrodes 150a, 150b, 150c, 150d, and 150e. However, since a common voltage is applied to the five first electrodes 130a to 130e, it is not necessarily to divide the first electrode 130. In the following, in some cases, the five first electrodes 130a to 130e will be described as the first electrode 130 without being particularly distinguished.

The first piezoelectric vibrating portion 100a and the second piezoelectric vibrating portion 100b which configure the piezoelectric vibrating unit are joined back-to-back to each other on the substrate 200 side. Accordingly, the piezoelectric elements 110a, 110b, 110c, 110d, and 110e of the second piezoelectric vibrating portion 100b are handled as those which are arranged at a symmetrical position where the vibrating body 210 serves as a symmetrical plane with respect to the piezoelectric elements 110a, 110b, 110c, 110d, and 110e of the first piezoelectric vibrating portion 100a. That is, the piezoelectric elements 110a and 110d within the four the piezoelectric elements 110a, 110b, 110c, and 110d of the second piezoelectric vibrating portion 100b are handled as the second piezoelectric elements 110c and 110b, and the piezoelectric elements 110b and 110c are handled as the first piezoelectric elements 110d and 110a.

The substrate 200 is used as a substrate for forming the first electrode 130, the piezoelectric substance 140, and the second electrode 150 through a film forming process. In addition, the vibrating body 210 of the substrate 200 also has a function as a vibrating plate for performing mechanical vibration. For example, the substrate 200 can be formed by using Si, $Al_2O_3$, $ZrO_2$, or the like. For example, as the substrate 200 made of Si (also referred to as a "silicon substrate 200"), it is possible to use Si wafer for semiconductor fabrication. For example, the thickness of the substrate 200 is preferably in a range of 10 µm to 100 µm. If the thickness of the substrate 200 is 10 µm or greater, it is possible to relatively easily handle the substrate 200 when the film forming process is performed on the substrate 200. If the thickness of the substrate 200 is 50 µm or greater, it is possible to more easily handle the substrate 200. In addition, if the thickness of the substrate 200 (vibrating body 210) is 100 µm or smaller, it is possible to easily vibrate the vibrating body 210 in accordance with the expansion and contraction of the piezoelectric substance 140 formed of a thin film.

In the present embodiment, the first electrode 130, the piezoelectric substance 140, and the second electrode 150 are also formed on the fixing portion 220. As a result, the thickness of the piezoelectric vibrating portion 100 in the vibrating body 210 and the thickness of the piezoelectric vibrating portion 100 in the fixing portion 220 can be substantially the same as each other (for example, a thickness difference can be set to 6 µm or smaller, or to 3 µm or smaller). In this manner, in a case where the plurality of piezoelectric vibrating portions 100 are superimposed on each other so as to configure the piezoelectric drive device 10, a gap between the two adjacent piezoelectric vibrating portions 100 in the vibrating body 210 and a gap between the two adjacent piezoelectric vibrating portions 100 in the fixing portion 220 can have substantially the same size as each other. Accordingly, variations are less likely to occur between the piezoelectric vibrating portions 100. It is preferable that the first electrode 130, the piezoelectric substance 140, and the second electrode 150 on the fixing portion 220 do not configure an operable piezoelectric element. If these do not configure the piezoelectric element, the piezoelectric substance 140 is not deformed. Accordingly, the fixing portion 220 is easily fixed to other members. A voltage is applied to the first electrode 130 and the second electrode 150 via a substrate electrode 250. However, the electrodes 130 and 150 and the piezoelectric substance 140 on the fixing portion 220 are separated from the electrodes 130 and 150 and the piezoelectric substance 140 on the vibrating body 210 so that the electrodes 130 and 150 and the piezoelectric substance 140 on the fixing portion 220 do not configure the operable piezoelectric element.

Figure 2:
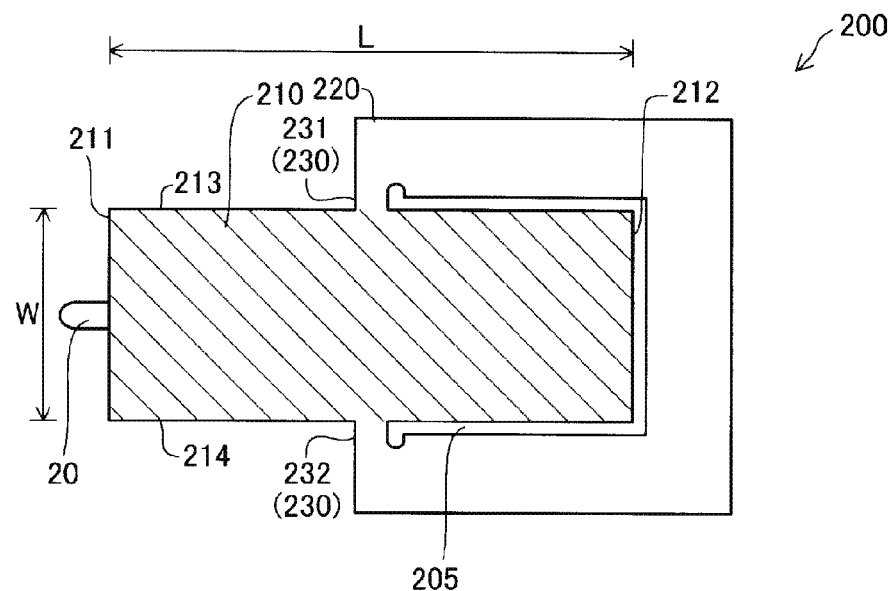
FIG. 2 is a plan view of a substrate.

FIG. 2 is a plan view of the substrate 200. The substrate 200 includes the vibrating body 210, the fixing portion 220, and the two connection portions 230 (the first connection portion 231 and the second connection portion 232) which connect the vibrating body 210 and the fixing portion 220. The vibrating body 210 has a rectangular shape including four sides of a first side 211, a second side 212, and a third side 213 and a fourth side 214 which connect the first side 211 and the second side 212 and which are longer than the first side 211. The two connection portions 230 are respectively disposed in an end portion of the fixing portion 220, and are connected to each central position of the third side 213 and the fourth side 214 of the vibrating body 210. The fixing portion 220 is arranged to a side closer to the second side 212 than the first side 211 so as to extend from the first connection portion 231 to the second connection portion 232 around the second side 212 side. The vibrating body 210, the fixing portion 220, and the connection portion 230 are integrally formed of one silicon substrate. Specifically, the silicon substrate having the piezoelectric element 110 formed therein is subjected to etching, thereby forming a shape of the individual substrate 200 and forming a gap 205 between the vibrating body 210 and the fixing portion 220. In this manner, the substrate 200 (the vibrating body 210, the fixing portion 220, and the connection portion 230) is integrally formed.

Although not illustrated, a wire layer configuring a wire for supplying electricity to the piezoelectric element 110 is formed on an upper layer or a lower layer of the piezoelectric element 110. A wire pattern (not illustrated) connected to the respective second electrodes 150a, 150b, 150c, 150d, and 150e of the five respective piezoelectric elements 110a, 110b, 110c, 110d, and 110e is disposed on the wire layer, and a wire pattern (not illustrated) connected to the first electrodes 130a to 130e in common is disposed on the wire layer. The wire patterns can be formed through the film forming process for forming the piezoelectric elements 110a, 110b, 110c, 110d, and 110e on the vibrating body 210 of the substrate 200.

A ratio between a length L of the vibrating body 210 (length of the third side 213 and the fourth side 214) and a width W (length of the first side 211 and the second side 212) is preferably set to be L:W=approximately 7:2. This ratio is a preferable value in order to perform ultrasonic vibration (to be described later) in which the vibrating body 210 is laterally bent along a plane thereof. For example, the length L of the vibrating body 210 can be set to fall within a range of 0.1 mm to 30 mm. For example, the width W can be set to fall within a range of 0.02 mm to 9 mm. In order for the vibrating body 210 to perform the ultrasonic vibration, the length L is preferably set to 50 mm or smaller.

The contact portion 20 (also referred to as a "protrusion portion" or an "operating portion") is disposed on the first side 211 of the vibrating body 210. The contact portion 20 comes into contact with the driven member 50, and applies a force to the driven member 50. It is preferable to form the contact portion 20 by using a durable material such as ceramics (for example, Si, SiC, Al$_2$O$_3$, ZrO$_2$) and the like. For example, the silicon substrate having the piezoelectric element 110 formed therein is subjected to etching. In this manner, it is possible to form the contact portion 20 so as to partially have a shape of the individual substrate 200. In addition, an independent contact portion can also be formed by being joined to the substrate 200 using an adhesive. In a case of the independent contact portion, the contact portion may be joined to the piezoelectric element 110 instead of the vibrating body 210 serving as the vibrating plate.

Figure 3:
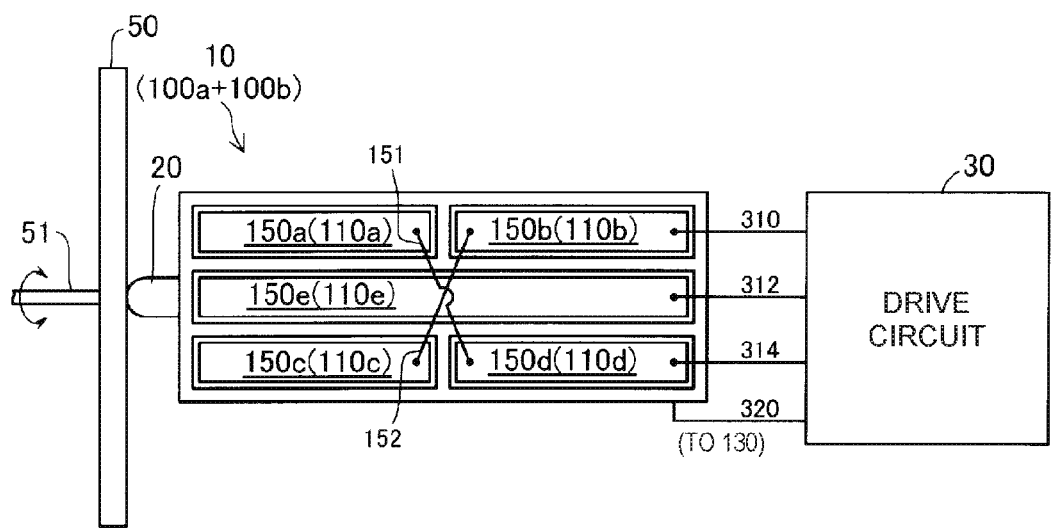
FIG. 3 is a view for describing an electrically connected state between the piezoelectric drive device and a drive circuit.

FIG. 3 is a view for describing an electrically connected state between the piezoelectric drive device 10 and a drive circuit 30. The drive circuit 30 generates a drive voltage including an AC component. The drive voltage including the AC component is preferably configured to be capable of generating at least one of an AC drive voltage having only the AC component varying on a positive side and a negative side with respect to a ground potential and an offset-provided drive voltage including the AC component and DC offset (DC component). It is preferable that the AC component of the drive voltage is an electrical signal whose drive frequency is a frequency close to a mechanical resonance frequency according to design of the piezoelectric vibrating portion 100, ideally, a resonance frequency. A waveform of the AC component is typically a sine wave, but the AC component may have a waveform other than the sine wave. The DC component may not necessarily be constant, and may vary to some extent. For example, the DC component may vary within ±10% of the average value. The drive circuit 30 and the electrodes 130 and 150 of the piezoelectric vibrating portions 100a and 100b are connected as follows.

Within the five second electrodes 150a, 150b, 150c, 150d, and 150e of the first piezoelectric vibrating portion 100a, the second electrodes 150a and 150d of the pair of first piezoelectric elements 110a and 110d located at the first opposite angle are electrically connected to each other via a wire 151. The second electrodes 150b and 150c of the pair of second piezoelectric elements 110b and 110c located at the other second opposite angle are also electrically connected to each other via a wire 152. The wires 151 and 152 are formed inside the substrate electrode 250 through the film forming process as described above. However, the wires may be realized by wiring work. The three second electrodes 150b, 150e, and 150d located on the right side in FIG. 3 and the first electrode 130 (FIG. 2) are electrically connected to the drive circuit 30 via wires 310, 312, 314, and 320. In the example illustrated in FIG. 3, the wire 320 is grounded. In addition, the first piezoelectric elements 110a and 110d, the second piezoelectric elements 110b and 110c, and the third piezoelectric element 110e are connected to the drive circuit 30 in parallel between the grounded wire 320 and the other wires 310, 312, and 314. Some portions of the wires 310, 312, 314, and 320 are formed inside the wire layer through the film forming process as described above. Other portions except for the portions formed inside the wire layer are formed by wiring work between the terminal of some wires formed inside the wire layer and the drive circuit 30. However, all of the wires 310, 312, 314, and 320 may be formed by wiring work. The connection of the second piezoelectric vibrating portion 100b is similar to the connection of the first piezoelectric vibrating portion 100a.

The drive circuit 30 applies a drive voltage including the AC component of the drive frequency between the second electrodes 150a and 150d and the first electrode 130 of the pair of first piezoelectric elements 110a and 110d of the respective piezoelectric vibrating portions 100a and 100b. In this manner, the piezoelectric vibrating portions 100a and 100b are caused to simultaneously perform ultrasonic vibration. Accordingly, the driven member (rotor in this example) 50 coming into contact with the contact portion 20 can be rotated in a predetermined rotation direction. In addition, the drive circuit 30 applies a drive voltage including the AC component of the drive frequency between the second electrodes 150b and 150c and the first electrode 130 of the pair of second piezoelectric elements 110b and 110c of the respective piezoelectric vibrating portions 100a and 100b. In this manner, the driven member 50 coming into contact with the contact portion 20 can be rotated in the opposite rotation direction. A wire (or a wire layer and an insulating layer) configuring the wires 151, 152, 310, 312, 314, and 320 illustrated in FIG. 3 is omitted in the illustration in FIG. 2.

Figure 4:
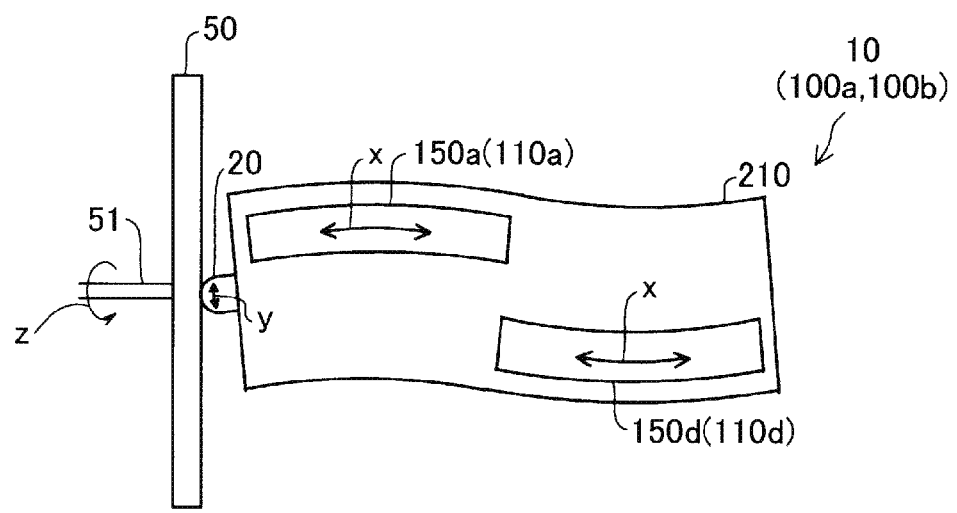
FIG. 4 is a view for describing an operation example of the piezoelectric drive device.

FIG. 4 is a view for describing an operation example of the piezoelectric drive device 10. The contact portion 20 of the piezoelectric drive device 10 is in contact with a rotation surface perpendicular to a center 51 of the driven member 50 configured to include a rotor. In the example illustrated in FIG. 4, the drive circuit 30 applies a drive voltage to the pair of first piezoelectric elements 110a and 110d of the respective piezoelectric vibrating portions 100a and 100b. The pair of first piezoelectric elements 110a and 110d expand and contract in a direction of an arrow x. In response to the expansion and contraction, the vibrating body 210 of the piezoelectric vibrating portions 100a and 100b is bent inside a plane of the vibrating body 210, and is deformed in a meandering shape (S-shape). A distal end of the contact portion 20 performs reciprocating movement or elliptical movement in a direction of an arrow y. As a result, the driven member 50 is rotated around the center 51 in a predetermined direction z. That is, the pair of first piezoelectric elements 110a and 110d cooperate with each other so as to bend the vibrating body 210. In a case where the drive circuit 30 applies a drive voltage to the other pair of second piezoelectric elements 110b and 110c, the driven member 50 is rotated in the opposite direction. If a drive voltage similar to that of the pair of first piezoelectric elements 110a and 110d (or the other pair of second piezoelectric elements 110b and 110c) is applied to the third piezoelectric element 110e at the center, the piezoelectric vibrating portions 100a and 100b expand and contract in the longitudinal direction. Accordingly, it is possible to further increase a force applied to the driven member 50 from the contact portion 20. This operation of the piezoelectric drive device 10 (or the piezoelectric vibrating portions 100a and 100b) is disclosed in JP-A-2004-320979 or the corresponding U.S. Pat. No. 7,224,102, the content of which is incorporated by reference.

Figure 5A:
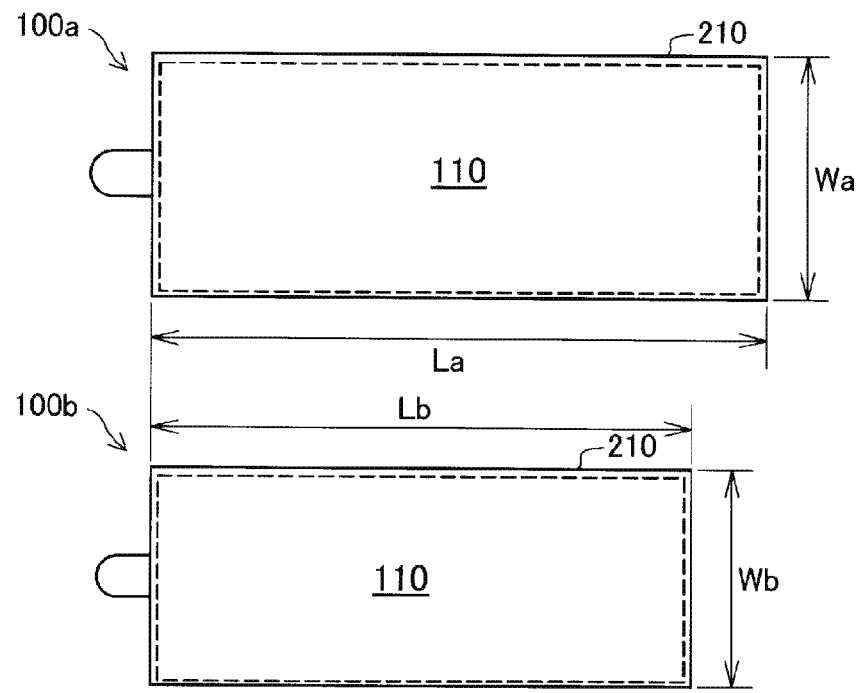
FIGS. 5A and 5B are views for describing characteristics of the piezoelectric drive device.
Figure 5B:
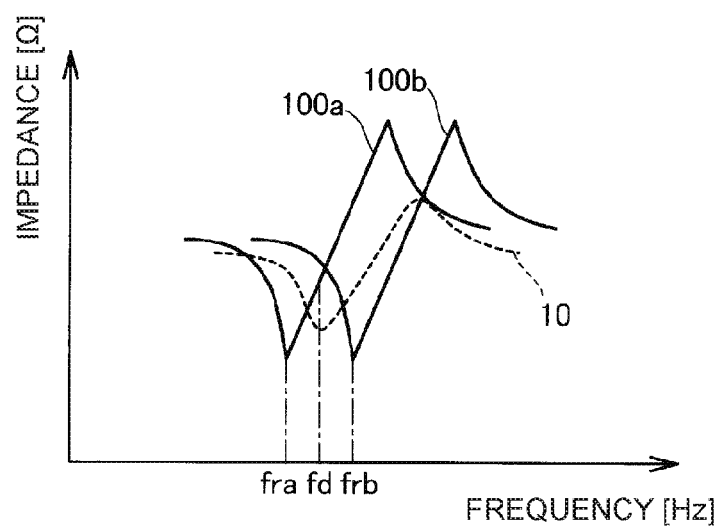

FIGS. 5A and 5B are views for describing characteristics of the piezoelectric drive device 10 according to the present embodiment. As illustrated in FIG. 5A, the piezoelectric drive device 10 includes the two piezoelectric vibrating portions 100a and 100b which are integrally formed as the piezoelectric vibrating unit. A rectangular region illustrated by a broken line in the drawing indicates a simplified region of the piezoelectric element 110 (the piezoelectric elements 110a, 110b, 110c, 110d, and 110e) formed on the vibrating body 210. Dimensions (a length La and a width Wa) of the first piezoelectric vibrating portion 100a are set to be larger than dimensions (a length Lb and a width Wb) of the second piezoelectric vibrating portion 100b. In FIG. 5A, a difference between the dimensions of the two piezoelectric vibrating portions 100a and 100b is exaggeratingly illustrated. A dimensional difference between the dimension of the first piezoelectric vibrating portion 100a and the design reference dimension, a dimensional difference between the dimension of the second piezoelectric vibrating portion 100b and the design reference dimension, and a dimensional difference between the dimension of the first piezoelectric vibrating portion 100a and the dimension of the second piezoelectric vibrating portion 100b are respectively set to a dimensional difference in which a significant difference can be recognized when dimensional processing accuracy is compared. The dimensional differences will be described later.

A resonance frequency frv of expansion and contraction vibration along the longitudinal direction (direction along La and Lb in FIG. 5A) of the piezoelectric vibrating portion 100 (referred to as "longitudinal primary vibration") is expressed by the following equation (1). A resonance frequency frh of bending vibration along the width direction (along Wa and Wb in FIG. 5A) (referred to as "in-plane bending secondary vibration") is expressed by the following equation (2).

$$frv = (krv/l) \cdot (E/\rho)^{1/2} \qquad (1)$$

$$frh = (krh \cdot w/l^2) \cdot (E/\rho)^{1/2} \qquad (2)$$

Here, l represents the length of the piezoelectric vibrating portion, w represents the width of the piezoelectric vibrating portion, E represents a Young's modulus of a member configuring the piezoelectric vibrating portion, and ρ represents density of the member configuring the piezoelectric vibrating portion. In addition, kry and krh represent a constant obtained from the member configuring the piezoelectric vibrating portion. In this example, kry=½, and krh=2.83.

Normally, a dimensional ratio L/W between the length L and the width W of the piezoelectric vibrating portion is preferably set to satisfy the following equation (3) based on the above-described equations (1) and (2) so that the resonance frequency fry of the longitudinal primary vibration and the resonance frequency frh of the in-plane bending secondary vibration are coincident with each other.

$$L/W = l/w = krh/kry \qquad (3)$$

Therefore, normally, a dimensional ratio L0/W0 of the reference dimension of the piezoelectric vibrating portion 100 is set to be a dimensional ratio equal to that in the above-described equation (3). A reference resonance frequency of the piezoelectric vibrating portion 100 is a resonance frequency in which the resonance frequency of the longitudinal primary vibration and the resonance frequency of the in-plane bending secondary vibration are coincident with each other. Similarly, a dimensional ratio La/Wa of the first piezoelectric vibrating portion 100a and a dimensional ratio Lb/Wb of the second piezoelectric vibrating portion 100b are also set to be the dimensional ratio equal to that in the above-described equation (3). A reference resonance frequency of the first piezoelectric vibrating portion 100a and the second piezoelectric vibrating portion 100b is also the resonance frequency in which the resonance frequency of the longitudinal primary vibration and the resonance frequency of the in-plane bending secondary vibration are coincident with each other. Hereinafter, the resonance frequency of the first piezoelectric vibrating portion 100a is referred to as a frequency fra, and the resonance frequency of the second piezoelectric vibrating portion 100b is referred to as a frequency frb. The actual dimensional ratio L/W is set to 7/2 as described with reference to FIG. 2, and is a smaller value than krh/kry=5.66. The reason is assumed that if the thickness of the piezoelectric element is thinned, the in-plane bending secondary vibration tends to be easily performed and accordingly, the actual in-plane bending resonance frequency becomes lower than the calculation value. Therefore, the actual dimensional ratio L/W is set to be 7/2 which is smaller than the dimensional ratio obtained by the above-described equations. In this manner, the resonance frequency of the longitudinal primary vibration and the resonance frequency of the in-plane bending secondary vibration are coincident with each other.

Here, as is understood from the above-described equations (1) and (2), if the length l is lengthened, the resonance frequency of the piezoelectric vibrating portion 100 becomes low. Accordingly, the resonance frequency fra of the first piezoelectric vibrating portion 100*a* becomes lower than the resonance frequency frb of the second piezoelectric vibrating portion 100*b*.

The first piezoelectric vibrating portion 100*a* and the second piezoelectric vibrating portion 100*b* in a respectively independent state have each impedance characteristic illustrated in FIG. 5B (illustrated by a solid line in the drawing). Therefore, in the respectively independent state, if the impedance characteristic varies due to a temperature change or a load change, it is considered that the resonance frequencies fra and frb or the drive characteristics vary greatly. The resonance frequency of mechanical vibration is regarded as the minimum impedance frequency in this example.

On the other hand, as illustrated in FIG. 5B, the respective impedance characteristics of the two piezoelectric vibrating portions 100*a* and 100*b* are superimposed on each other. In this manner, the impedance characteristic synthesized as the overall piezoelectric drive device 10 including the two piezoelectric vibrating portions 100*a* and 100*b* shows a characteristic in a state where an impedance change (change rate) with respect to a frequency change is minimized. Therefore, it is possible to minimize the change rate of the impedance in the vicinity of a drive frequency fd set to the resonance frequency or the frequency in the vicinity thereof in the synthesized impedance characteristic. In this manner, even if the impedance characteristic of the piezoelectric vibrating portions 100*a* and 100*b* varies due to a temperature change or a load change, it is possible to minimize the impedance change as the overall piezoelectric drive device 10 in the drive frequency fd when the driven member 50 is driven. Accordingly, it is possible to restrain the influence of the varied drive characteristic (amplitude of a drive voltage or a drive current). In particular, the piezoelectric drive device 10 employs the piezoelectric vibrating unit in which the two piezoelectric vibrating portions 100*a* and 100*b* are integrally formed. Accordingly, the respective operations are impeded by each other, thereby increasing a synthesized effect of the respective impedance characteristics. In this regard, it is considered that an effect increases in restraining the impedance change (change rate) with respect to the frequency change in the impedance characteristic of the overall piezoelectric drive device 10.

In a case where the piezoelectric vibrating portion 100 is formed through the above-described film forming process, the dimensions (length and width) can be processed with processing accuracy of ±0.3 μm to ±1.0 μm. Since the maximum length dimension of the piezoelectric vibrating portion 100 is 60 mm, the dimensions can be processed with the dimensional processing accuracy of the maximum ±0.0005% with respect to the reference dimensions. For this reason, in order that the impedance characteristics are allowed to have a significant difference by the dimensional difference of the respective piezoelectric vibrating portions of the plurality of piezoelectric vibrating portions 100*a* and 100*b*, it is preferable to set a dimensional difference which is equal to or greater than 0.001% of at least twice the dimensional processing accuracy with respect to the average dimension of the plurality of piezoelectric vibrating portions. However, the dimensional difference may be set to 0.003% or greater by which the piezoelectric vibrating portion 100 can be manufactured through the film forming process, or the dimensional difference may be set to 0.1% or greater by which the piezoelectric vibrating portion 100 can be manufactured through mechanical processing. In addition, it is preferable to set the dimensional difference to 5% or smaller. In addition, the dimensional difference may be set to be greater than 1% and equal to or smaller than 5% of the average dimension.

In addition, as is understood from the above-described equations (1) and (2), a change in the resonance frequencies fra and frb corresponding to the dimensional difference between the piezoelectric vibrating portions 100*a* and 100*b* substantially follows a dimensional change. Accordingly, a difference between the resonance frequency fra of the first piezoelectric vibrating portion 100*a* and the resonance frequency frb of the second piezoelectric vibrating portion 100*b* is preferably a difference of 0.001% or greater with respect to the average resonance frequency of the plurality of piezoelectric vibrating portions, and is preferably a difference of 5% or smaller. In addition, the difference may be a difference of 0.003% or greater of the average resonance frequency, may be a difference of 0.1% or greater, or may be a difference in a range of being greater than 1% and equal to or smaller than 5%.

Whether or not the resonance frequency of the piezoelectric vibrating portion 100 used as the piezoelectric vibrating portions 100*a* and 100*b* configuring the piezoelectric vibrating unit serving as the piezoelectric drive device 10 falls within the above-described range can be confirmed as follows.

Figure 6:
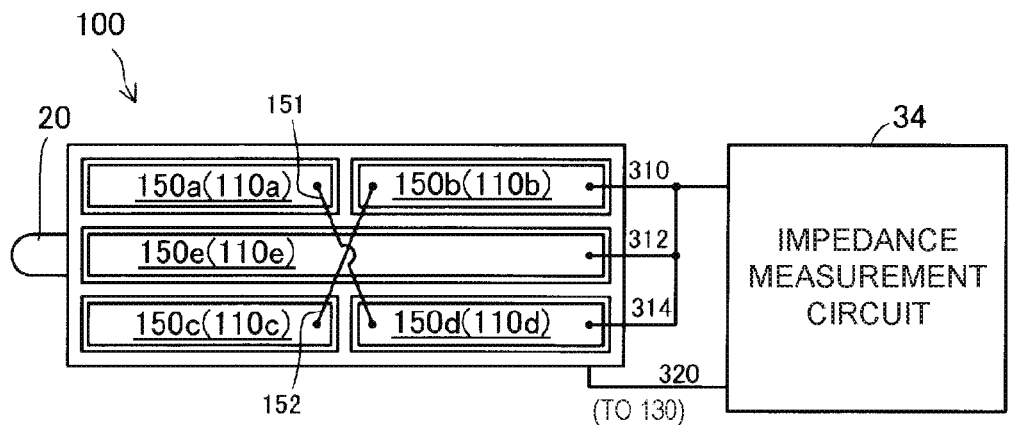
FIG. 6 is a view for describing a circuit for measuring an impedance characteristic of a piezoelectric vibrating portion.

FIG. 6 is a view for describing a circuit for measuring the impedance characteristic of the piezoelectric vibrating portion 100. The impedance characteristic of the piezoelectric vibrating portion 100 can be measured by using an impedance measurement circuit 34. The resonance frequency of the piezoelectric vibrating portion 100 can be obtained, based on the measured impedance characteristic. As the impedance measurement circuit 34, an impedance analyzer, an impedance meter, or the like is used.

All of the five piezoelectric elements 110*a*, 110*b*, 110*c*, 110*d*, and 110*e* of the measurement target piezoelectric vibrating portion 100 are connected to the impedance measurement circuit 34 in parallel, and the impedance characteristic is measured. In this manner, a resonance frequency fr is obtained by analyzing the measurement result. In this example, as the resonance frequency fr, a frequency whose impedance is minimum is used as described above. Then, within the measured piezoelectric vibrating portions 100, the two piezoelectric vibrating portions 100 in which the difference of the resonance frequency falls within a range of 0.001% to 5% of the average resonance frequency are selected. The piezoelectric vibrating portion 100 having a low resonance frequency is set to be the first piezoelectric vibrating portion 100*a*, and the piezoelectric vibrating portion 100 having a high resonance frequency is set to be the second piezoelectric vibrating portion 100*b*. In this manner, it is possible to configure the piezoelectric drive device 10 by using the piezoelectric vibrating unit in which the two piezoelectric vibrating portions 100*a* and 100*b* are integrally formed within a range where a difference between the minimum resonance frequency and the maximum resonance frequency is 0.001% to 5% of the average resonance frequency or is greater than 1% and equal to or smaller than 5%.

Figure 7:
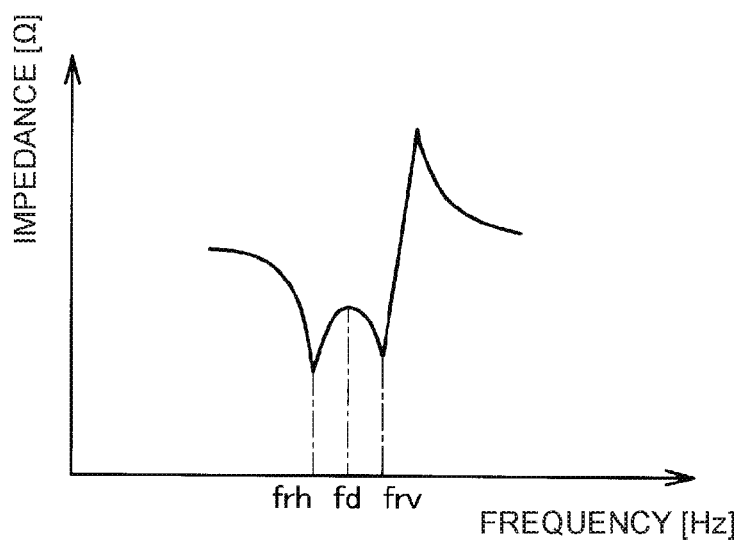
FIG. 7 is a view for describing an impedance characteristic in a case where a resonance frequency of a longitudinal primary vibration and a resonance frequency of an in-plane bending secondary vibration are deviated.

FIG. 7 is a view for describing the impedance characteristic in a case where the resonance frequency fry of the longitudinal primary vibration and the resonance frequency frh of the in-plane bending secondary vibration are deviated. In some cases, depending on a setting difference of the dimensional ratio L/W or processing accuracy of the piezoelectric vibrating portion 100, the impedance characteristic shows a state where the resonance frequency fry of the longitudinal primary vibration and the resonance frequency frh of the in-plane bending secondary vibration are deviated. In this case, the piezoelectric vibrating portion 100 used as the two piezoelectric vibrating portions 100a and 100b may be selected by setting the resonance frequency frh of the in-plane bending secondary vibration for causing the piezoelectric drive device 10 to mainly drive the driven member to be the resonance frequency fr. However, without being limited thereto, the piezoelectric vibrating portion 100 used as the two piezoelectric vibrating portions 100a and 100b may be selected by setting the resonance frequency fry of the primary vibration to be the resonance frequency fr.

Figure 8A:
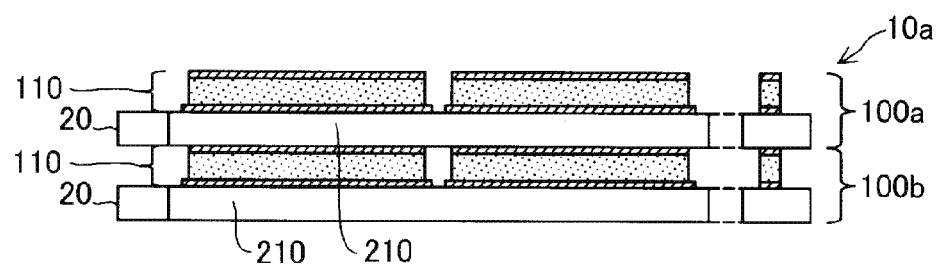
FIGS. 8A and 8B are sectional views of a piezoelectric drive device as a modification example of the piezoelectric drive device.
Figure 8B:
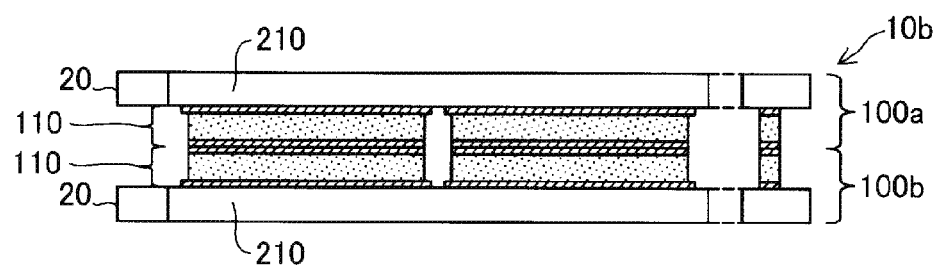

FIGS. 8A and 8B are sectional views of piezoelectric drive devices 10a and 10b as a modification example of the piezoelectric drive device 10. The piezoelectric drive device 10 according to the embodiment illustrated in FIGS. 1A and 1B is a piezoelectric vibrating unit in which the vibrating bodies 210 of the substrates 200 of the two piezoelectric vibrating portions 100a and 100b are integrally formed while facing each other and being joined to each other. In contrast, the piezoelectric drive device 10a in FIG. 8A is the piezoelectric vibrating unit in which two piezoelectric vibrating portions 100a and 100b are stacked on and joined to each other in the same direction. In addition, the piezoelectric drive device 10b in FIG. 8B is a piezoelectric vibrating unit in which piezoelectric elements 110 of the two piezoelectric vibrating portions 100a and 100b are joined to each other. Similarly to FIGS. 1A and 1B and FIGS. 8A to 9 (to be described below) also omit the illustration of a wire layer formed on the upper layer or the lower layer of the piezoelectric element 110.

Figure 9:
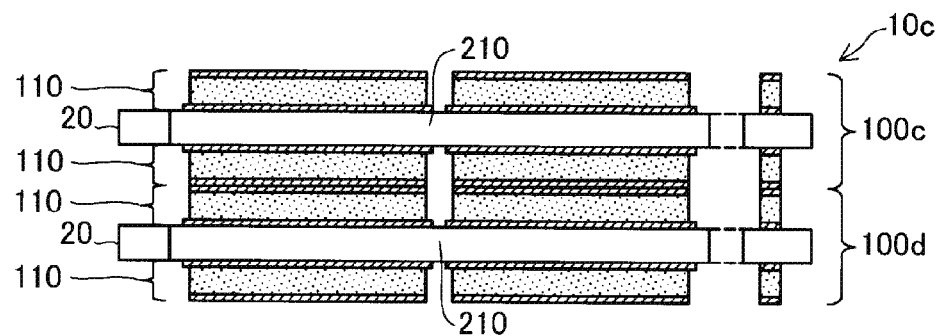
FIG. 9 is a sectional view of a piezoelectric drive device as another modification example of the piezoelectric drive device.

FIG. 9 is a sectional view of a piezoelectric drive device 10c as another modification example of the piezoelectric drive device 10. The piezoelectric drive device 10c is a piezoelectric vibrating unit in which two piezoelectric vibrating portions 100c and 100d are stacked on and joined to each other. All of the two piezoelectric vibrating portions 100c and 100d are configured to include the piezoelectric element on both surfaces of the vibrating body 210. For example, after the piezoelectric element 110 is formed on one surface of the substrate 200 through the film forming process, the piezoelectric element 110 can be formed on the other surface. The two piezoelectric vibrating portions 100c and 100d are joined to each other in such a way that the piezoelectric element 110 on the lower side of the first piezoelectric vibrating portion 100c on the upper side and the piezoelectric element 110 on the upper side of the second piezoelectric vibrating portion 100d are bonded together using an adhesive (not illustrated). The resonance frequency of the piezoelectric vibrating portions 100c and 100d can be obtained by measuring the impedance characteristic after connecting all of the piezoelectric elements 110 formed on both surfaces of the vibrating body 210 to the impedance measurement circuit 34 (FIG. 6) in parallel.

Similarly to the embodiment, the piezoelectric drive devices 10a, 10b, and 10c configured to include the piezoelectric vibrating unit according to the modification examples can also minimize the impedance change in the drive frequency when the overall piezoelectric drive device drives the driven member, and can restrain the influence of the varied drive characteristic.

In addition, an example has been described where the piezoelectric drive devices 10, 10a, 10b, and 10c are the piezoelectric vibrating units in which the two piezoelectric vibrating portions are integrally formed. However, without being limited thereto, the piezoelectric vibrating units may be employed in which three or more piezoelectric vibrating portions are integrally formed. In this case, the plurality of piezoelectric vibrating portions may be configured so that a difference between the maximum resonance frequency and the minimum resonance frequency in the respective resonance frequencies falls within a range of 0.001% to 5% of the average resonance frequency or greater than 1% and equal to or smaller than 5% of the average resonance frequency. In a case where the piezoelectric drive device is configured to include the piezoelectric vibrating unit in which three or more piezoelectric vibrating portions are integrally formed, a synthesized effect of the respective impedance characteristic is obtained. Accordingly, an effect can effectively increase in restraining the impedance change (change rate) with respect to the frequency change in the impedance characteristic of the overall piezoelectric drive device 10. Therefore, it is possible to effectively restrain the influence of the varied drive characteristic.

A "dimensional difference" in a case of three or more piezoelectric vibrating portions means a dimensional difference between the maximum and the minimum. In addition, the description of "the dimensional difference falls within an allowable range" means that both a dimensional difference between the longitudinal dimensions, a difference between the lateral dimensions of the rectangular vibrating plate fall within the allowable range. Then, the longitudinal dimension of the maximum is larger than the longitudinal dimension of the minimum, and the lateral dimension of the maximum is larger than the lateral dimension of the minimum. In addition, the piezoelectric vibrating portions other than the maximum and the minimum may have a dimension which is substantially equal to the average value. That is, a dimensional difference from the average value may be smaller than the allowable range. In addition, similarly to the case of the dimensional difference, a difference between the resonance frequencies in a case of three or more piezoelectric vibrating portions also means a difference between the maximum and the minimum. The piezoelectric vibrating portions other than the maximum and the minimum may have a resonance frequency which is substantially equal to the average resonance frequency. That is, a frequency difference from the average resonance frequency may be smaller than the allowable range.

In addition, an example has been described where the piezoelectric drive devices 10, 10a, 10b, and 10c are the piezoelectric vibrating units in which the two piezoelectric vibrating portions 100 are stacked on each other in a normal direction perpendicular to a plane of the vibrating body 210. However, the piezoelectric vibrating unit may be employed in which two or more piezoelectric vibrating portions 100 are integrally formed by being arranged along the plane of the vibrating body 210.

Figure 10:
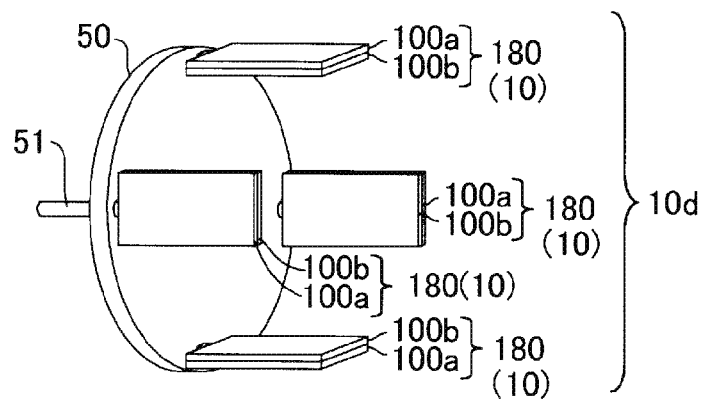
FIG. 10 is a schematic configuration diagram of a piezoelectric drive device according to a second embodiment.

B. Second Embodiment:

FIG. 10 is a schematic configuration diagram of a piezoelectric drive device 10d according to a second embodiment. In the first embodiment, the piezoelectric drive device 10 and the modification example have been described which include one piezoelectric vibrating unit in which the two piezoelectric vibrating portions 100a and 100b are integrally formed, but the configuration is not limited thereto. As illustrated in FIG. 10, the piezoelectric drive device 10d may be employed which includes a plurality of (four in the illustrated example) piezoelectric vibrating units 180. The piezoelectric vibrating unit 180 has the two piezoelectric vibrating portions 100a and 100b which are integrally formed, and corresponds to the piezoelectric drive device 10 according to the first embodiment. However, the plurality of piezoelectric vibrating units 180 may be configured to include the piezoelectric vibrating portion in which a difference between the maximum resonance frequency and the minimum resonance frequency in the resonance frequencies of the piezoelectric vibrating portion 100 included in the respective piezoelectric vibrating units 180 falls within a range of 0.001% to 5% of the average resonance frequency, within a range of 0.003% to 5% of the average resonance frequency, within a range of 0.1% to 5% of the average resonance frequency, or within a range of being greater than 1% and equal to or smaller than 5% of the average resonance frequency.

Similarly to the piezoelectric drive device 10 according to the first embodiment, the piezoelectric drive device 10*d* according to the present embodiment employs the piezoelectric vibrating unit 180 in which the two piezoelectric vibrating portions 100*a* and 100*b* are integrally formed. Accordingly, it is possible to effectively minimize the impedance change (change rate) with respect to the frequency change in the impedance characteristic of the piezoelectric vibrating unit. It is possible to effectively restrain variations in the drive characteristic in which the piezoelectric vibrating unit 180 drives the driven member 50. In addition, the respective impedance characteristics of the plurality of piezoelectric vibrating units 180 are superimposed on each other. In this manner, it is possible to minimize the impedance change (change rate) with respect to the frequency change in the impedance characteristic of the overall piezoelectric drive device 10*d*. It is possible to restrain variations in the drive characteristic in which the piezoelectric drive device 10*d* drives the driven member 50, and it is possible to improve drive efficiency.

The number of the piezoelectric vibrating units 180 is not limited to four, and may be at least two. In addition, without being limited to the piezoelectric drive device 10, as the piezoelectric vibrating unit 180, it is possible to employ the piezoelectric drive device according to the various modification examples described in the first embodiment.

Figure 11:
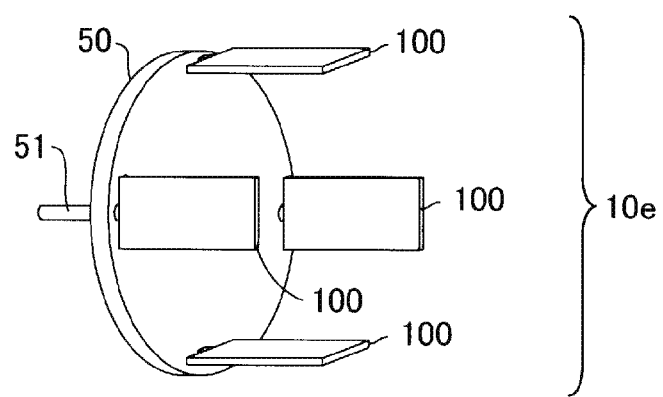
FIG. 11 is a schematic configuration diagram of a piezoelectric drive device according to a third embodiment.

C. Third Embodiment:

FIG. 11 is a schematic configuration diagram of a piezoelectric drive device 10*e* according to a third embodiment. In the second embodiment, the piezoelectric drive device 10*d* having a configuration including the plurality of piezoelectric vibrating units 180 has been described an example. However, as illustrated in FIG. 11, the piezoelectric drive device 10*e* having a configuration including the plurality of piezoelectric vibrating portions 100 may be employed. However, as described above, as the plurality of piezoelectric vibrating portions 100, the plurality of piezoelectric vibrating portions are employed in which a difference between the maximum resonance frequency and the minimum resonance frequency in the respective resonance frequencies falls within a range of 0.001% to 5% of the average resonance frequency, within a range of 0.003% to 5% of the average resonance frequency, within a range of 0.1% to 5% of the average resonance frequency, or within a range of being greater than 1% and equal to or smaller than 5% of the average resonance frequency.

In the piezoelectric drive device 10*e* according to the present embodiment, the respective impedance characteristics of the plurality of piezoelectric vibrating portions 100 are superimposed on each other. In this manner, it is possible to minimize the impedance change (change rate) with respect to the frequency change in the impedance characteristic of the overall piezoelectric drive device 10*e*. It is possible to restrain variations in the drive characteristic in which the piezoelectric drive device 10*e* drives the driven member 50, and it is possible to improve drive efficiency.

Instead of the piezoelectric vibrating portion 100, the piezoelectric vibrating portion may be employed in which the piezoelectric element 110 is formed on both surfaces of the vibrating body 210 illustrated in FIG. 9.

D. Another Embodiment of Piezoelectric Vibrating Portion

Figure 12A:
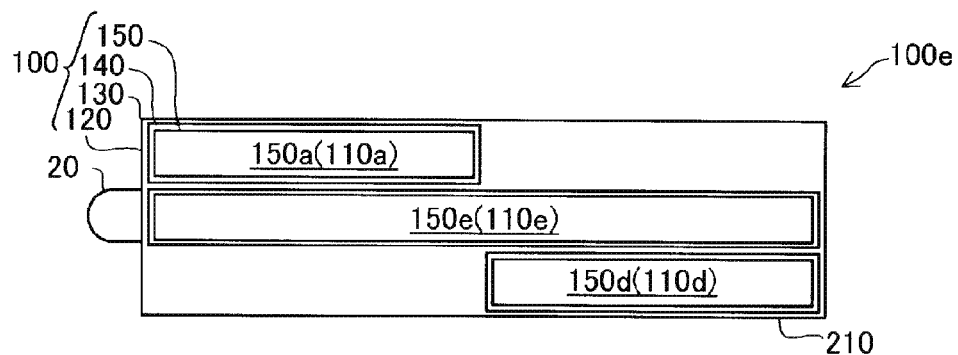
FIGS. 12A to 12C are plan views of a piezoelectric vibrating portion according to another embodiment.
Figure 12B:
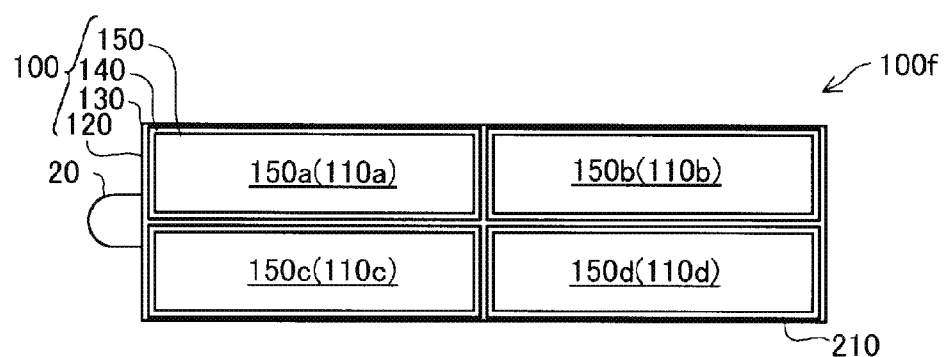
Figure 12C:
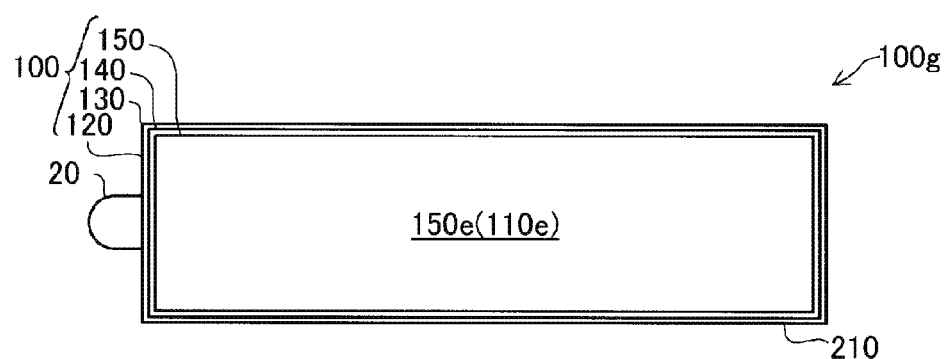

FIG. 12A is a plan view of a piezoelectric vibrating portion 100*e* according to another embodiment, and is a view corresponding to FIG. 1A according to the above-described embodiment. For the convenience of illustration, FIGS. 12A to 12C illustrate only the vibrating body 210, and omit the illustration of the fixing portion 220 and the connection portion 230. In the piezoelectric vibrating portion 100*e* in FIG. 12A, the pair of piezoelectric elements 110*b* and 110*c* are omitted. The piezoelectric drive device employing the piezoelectric vibrating portion 100*e* can also rotate the driven member (rotor) 50 in one direction z as illustrated in FIGS. 5A and 5B. The same voltage is applied to the second electrodes 150*a*, 150*e*, and 150*d* of the three piezoelectric elements 110*a*, 110*e*, and 110*d* in FIG. 12A. Accordingly, the three second electrodes 150*a*, 150*e*, and 150*d* may be formed as one continuous electrode layer.

FIG. 12B is a plan view of a piezoelectric vibrating portion 100*f* according to further another embodiment of the invention. In the piezoelectric vibrating portion 100*f*, the piezoelectric element 110*e* in the center in FIG. 1A is omitted. The other four piezoelectric elements 110*a*, 110*b*, 110*c*, and 110*d* are formed to have a larger area than those in FIG. 1A. The piezoelectric vibrating portion 100*f* can achieve an advantageous effect which is substantially similar to that according to the first embodiment.

FIG. 12C is a plan view of a piezoelectric vibrating portion 100*g* according to still further another embodiment of the invention. In the piezoelectric vibrating portion 100*g*, the four piezoelectric elements 110*a*, 110*b*, 110*c*, and 110*d* in FIG. 1A are omitted. One piezoelectric element 110*e* is formed to have a large area. The piezoelectric vibrating portion 100*g* just expands and contracts in the longitudinal direction. However, the piezoelectric vibrating portion 100*g* can apply a great force to a driven member (not illustrated) from the contact portion 20.

As can be understood from FIGS. 1A, 1B, and 12A to 12C, as the second electrode 150 of the piezoelectric vibrating portion 100, it is possible to dispose at least one electrode layer. However, as in the embodiments illustrated in FIGS. 1A, 1B, 12A, and 12B, it is preferable to dispose the second electrode 150 at an opposite angle position of the rectangular piezoelectric vibrating portion 100 in that the piezoelectric vibrating portion 100 can be deformed in a meandering shape which is bent inside a plane thereof.

E. Another Embodiment of Piezoelectric Drive Device

Figure 13A:
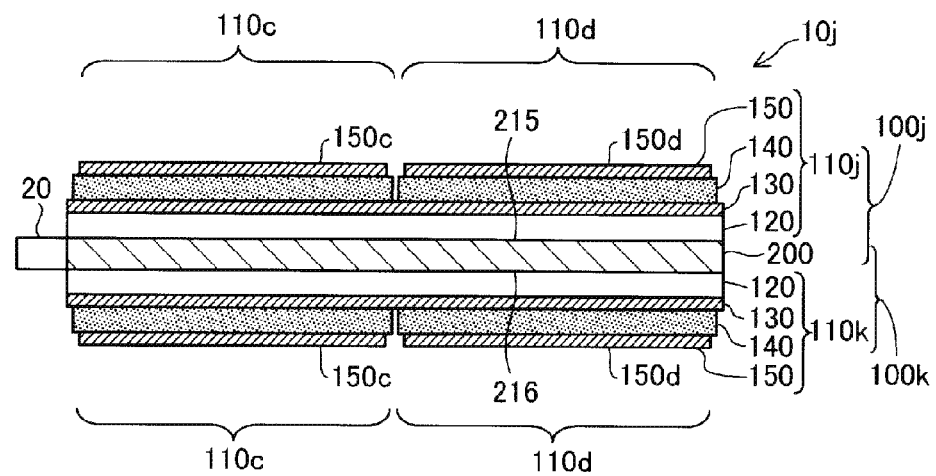
FIGS. 13A and 13B are sectional views of a piezoelectric drive device according to another embodiment.
Figure 13B:
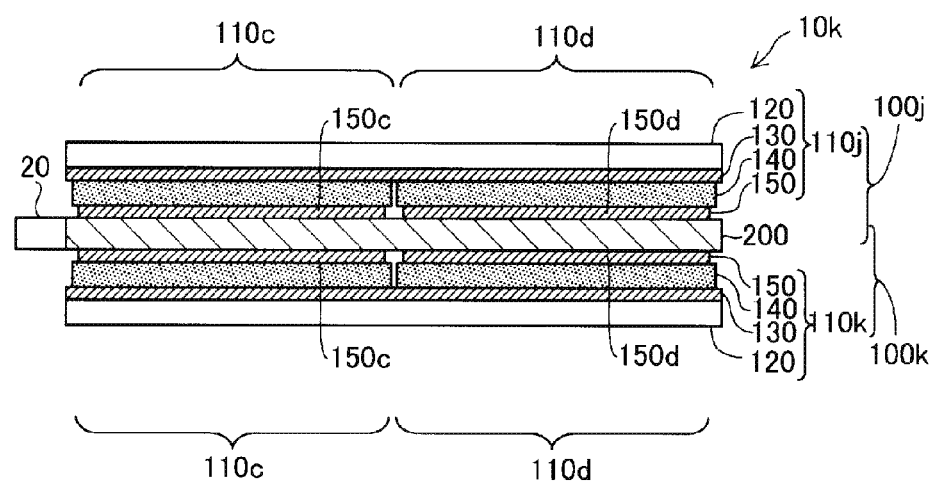

FIGS. 13A and 13B are sectional views of piezoelectric drive devices 10*j* and 10*k* according to another embodiment of the invention, and are views corresponding to FIG. 1B. In the piezoelectric drive device 10 according to the first embodiment, a configuration in which the substrate 200 functions as a substrate for the film forming process and the vibrating body 210 of the substrate 200 functions as a vibrating plate has been described as an example. However, without being limited thereto, as described below, a configuration may be adopted which independently includes the substrate for the film forming process and the vibrating plate.

The piezoelectric drive device 10*j* in FIG. 13A includes a vibrating plate 200, and two piezoelectric elements 110*j* and 110*k* which are respectively arranged on both surfaces (first surface 215 and second surface 216) of the vibrating plate 200. The piezoelectric elements 110j and 110k include a substrate 120, the first electrode 130 formed on the substrate 120, the piezoelectric substance 140 formed on the first electrode 130, and the second electrode 150 formed on the piezoelectric substance 140. The piezoelectric drive device 10k in FIG. 13B is arranged in the vibrating plate 200 in a state where the piezoelectric elements 110j and 110k are vertically inverted from the arrangement in FIG. 13A. That is, here, the arrangement is made so that the second electrode 150 is close to the vibrating plate 200 and the substrate 120 is farthest from the vibrating plate 200. Similarly to FIGS. 8A to 9 and FIGS. 13A and 13B omit the illustration of a wire (or a wire layer and an insulating layer) for electrical connection among the second electrodes 150a, 150b, 150c, 150d, and 150e, and a wire (or a wire layer and an insulating layer) for electrical connection among the first electrode 130, the second electrodes 150a, 150b, 150c, 150d, and 150e, and the drive circuit.

Similarly to the piezoelectric element 110 (FIGS. 1A and 1B) of the piezoelectric vibrating portions 100a and 100b according to the first embodiment, the piezoelectric elements 110j and 110k can be respectively formed through the film forming process. The vibrating plate 200 and the piezoelectric element 110j, and the vibrating plate 200 and the piezoelectric element 110k respectively correspond to the two piezoelectric vibrating portions 100j and 100k which are integrally formed in the present embodiment. The two piezoelectric vibrating portions 100j and 100k are configured in such a way that the resonance frequency of the piezoelectric element 110 before being arranged in the vibrating plate 200 is measured and the piezoelectric element 110 satisfying the above-described range of the resonance frequency is arranged in the vibrating plate 200. The piezoelectric drive devices 10j and 10k can also achieve an advantageous effect which is the same as that according to the first embodiment.

In addition, the piezoelectric drive device can also be configured so that the plurality of piezoelectric vibrating portions 100j having the piezoelectric element 110j formed on one surface 211 of the vibrating plate 200 are joined similarly to the piezoelectric drive devices 10a and 10b illustrated in FIGS. 8A and 8B. In addition, the piezoelectric drive device can also be configured so that the plurality of piezoelectric drive devices 10j or piezoelectric drive devices 10k are joined similarly to the piezoelectric drive device 10c illustrated in FIG. 9.

F. Embodiment of Device Using Piezoelectric Drive Device

The above-described piezoelectric drive device can apply a great force to the driven member by using resonance, and is applicable to various devices. For example, the piezoelectric drive device can be used as a drive device for various devices such as a robot, an electronic component conveying device (IC handler), a drug dispensing pump, calendar operating device in a timepiece, a printing device (for example, a paper feeding mechanism. However, the piezoelectric drive device is not applicable to a head, since the piezoelectric drive device used for the head does not cause the vibrating plate to resonate). Hereinafter, representative embodiments will be described.

Figure 14:
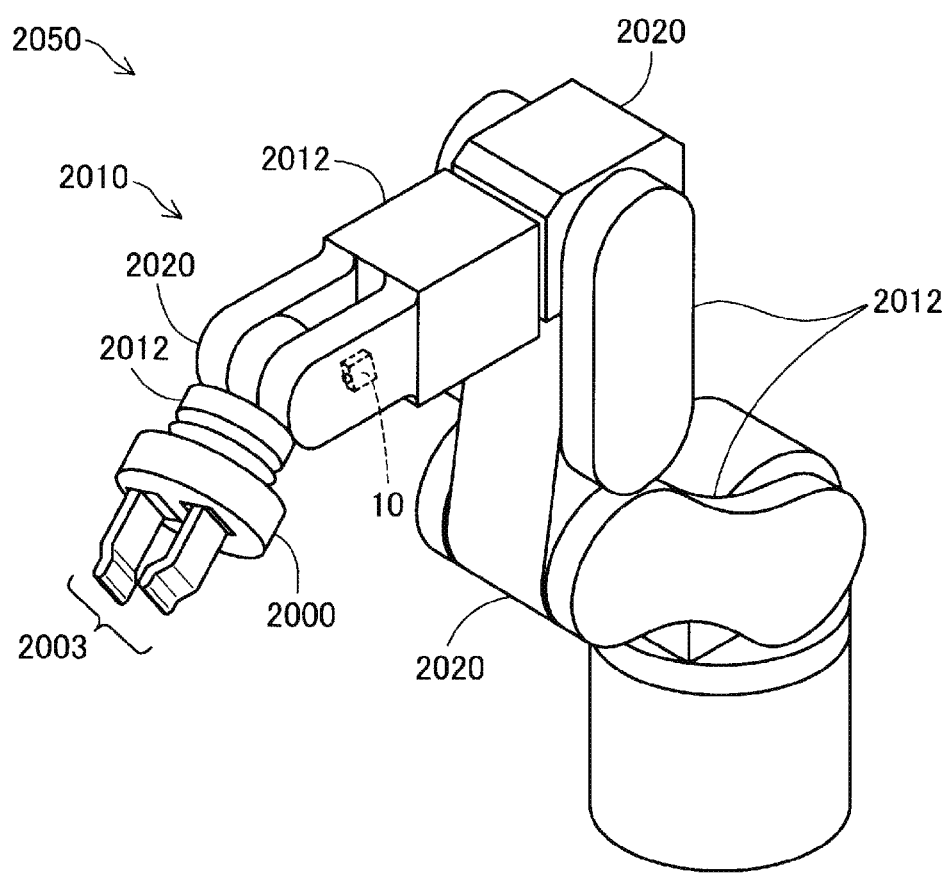
FIG. 14 is a view for describing an example of a robot using the above-described piezoelectric drive device.

FIG. 14 is a view for describing an example of a robot 2050 using the above-described piezoelectric drive device 10. The robot 2050 has an arm 2010 (also referred to as an "arm unit") which includes a plurality of link portions 2012 (also referred to as a "link member") and a plurality of joint portions 2020 for connecting the link portions 2012 to each other in a pivotable or bendable state. The above-described piezoelectric drive device 10 is incorporated in the respective joint portions 2020, and the joint portions 2020 can be pivotally moved or bent at any desired angle by using the piezoelectric drive device 10. A robot hand 2000 is connected to a distal end of the arm 2010. The robot hand 2000 includes a pair of gripping portions 2003. The piezoelectric drive device 10 is also incorporated in the robot hand 2000. The robot hand 2000 can grip an object by using the piezoelectric drive device 10 so as to open and close the gripping portions 2003. The piezoelectric drive device 10 is also disposed between the robot hand 2000 and the arm 2010. The robot hand 2000 can be rotated with respect to the arm 2010 by using the piezoelectric drive device 10. The drive circuit 30 for controlling each piezoelectric drive device 10 is included in a control circuit (not illustrated).

Figure 15:
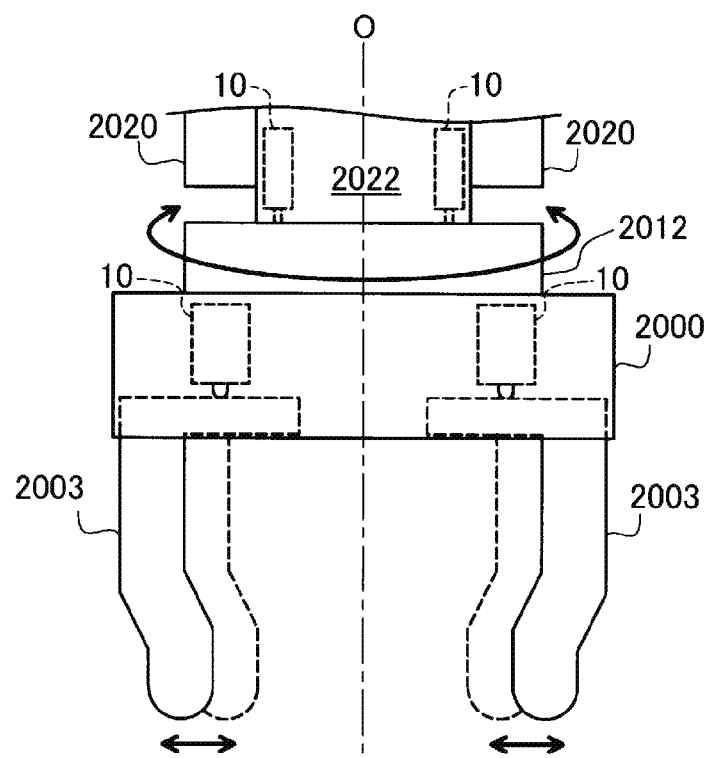
FIG. 15 is a view for describing a wrist portion of the robot illustrated in FIG. 14.

FIG. 15 is a view for describing a wrist portion of the robot 2050 illustrated in FIG. 14. The joint portions 2020 on the wrist interpose a wrist pivotal moving portion 2022 therebetween, and the link portion 2012 on the wrist is attached to the wrist pivotal moving portion 2022 so as to be pivotally movable around a central axis O of the wrist pivotal moving portion 2022. The wrist pivotal moving portion 2022 includes the piezoelectric drive device 10. The piezoelectric drive device 10 pivotally moves the link portion 2012 on the wrist and the robot hand 2000 around the central axis O. The plurality of gripping portions 2003 are erected in the robot hand 2000. A proximal end portion of the gripping portion 2003 is movable inside the robot hand 2000. The piezoelectric drive device 10 is mounted on a base portion of the gripping portion 2003. Therefore, the gripping portions 2003 are moved so as to grip a target by operating the piezoelectric drive device 10. In addition, the arm 2010 or the wrist can be manually operated by operating the piezoelectric drive device 10 in a free mode (so-called "teaching"), and an operation to be performed by the robot 2050 can be stored.

As the robot, without being limited to a single arm robot, the piezoelectric drive device 10 is also applicable to a multi-arm robot in which the number of arms is two or more. Here, in addition to the piezoelectric drive device 10, the joint portion 2020 on the wrist or the inside of the robot hand 2000 includes a power line for supplying power to various devices such as a force sensor and a gyro sensor or signal line for transmitting a signal. Accordingly, enormous wiring is needed. Therefore, it was very difficult to arrange the wires inside the joint portion 2020 or the robot hand 2000. However, the piezoelectric drive device 10 according to the above-described embodiments can decrease a drive current compared to a normal electric motor or the piezoelectric drive device in the related art. Therefore, it is possible to arrange the wires even in a small space such as the joint portion 2020 (particularly, a distal end joint portion of the arm 2010) and the robot hand 2000.

Figure 16:
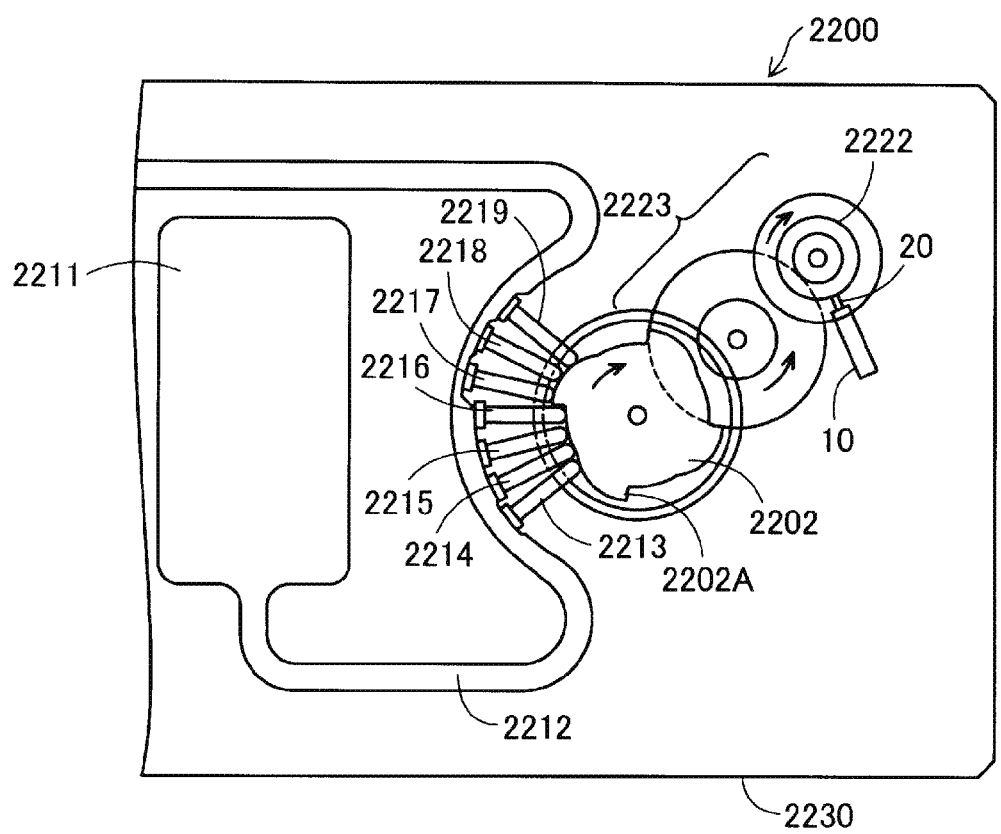
FIG. 16 is a view for describing an example of a robot using a piezoelectric drive device.

FIG. 16 is a view for describing an example of a liquid feeding pump 2200 employing the above-described piezoelectric drive device 10. In the liquid feeding pump 2200, a case 2230 internally has a reservoir 2211, a tube 2212, the piezoelectric drive device 10, a rotor 2222, a deceleration transmission mechanism 2223, a cam 2202, and a plurality of fingers 2213, 2214, 2215, 2216, 2217, 2218, and 2219. The drive circuit 30 is not illustrated. The reservoir 2211 is an accommodation section for accommodating a liquid which is a transport target. The tube 2212 is used in order to transport the liquid fed from the reservoir 2211. The contact portion 20 of the piezoelectric drive device 10 is disposed in a state of being pressed against a side surface of the rotor 2222, and the piezoelectric drive device 10 rotatably drives the rotor 2222. A rotation force of the rotor 2222 is transmitted to the cam 2202 via the deceleration transmission mechanism 2223. The fingers 2213 to 2219 are members for blocking the tube 2212. If the cam 2202 is rotated, the fingers 2213 to 2219 are sequentially pressed radially outward by a protrusion portion 2202A of the cam 2202. The fingers 2213 to 2219 block the tube 2212 sequentially from the upstream side (reservoir 2211 side) in the transport direction. In this manner, the liquid inside the tube 2212 is sequentially transported to the downstream side. According to this configuration, an extremely small amount of the liquid can be accurately fed. Moreover, a miniaturized liquid feeding pump 2200 can be realized. An arrangement of each member is not limited to the illustrated example. A configuration may be adopted in which a ball disposed in the rotor 2222 blocks the tube 2212 without providing the fingers. The above-described liquid feeding pump 2200 can be utilized for a drug dispensing device which administers a drug solution such as insulin to a human body. Here, a drive current is decreased by using the piezoelectric drive device 10 according to the above-described embodiments, compared to the piezoelectric drive device in the related art. Accordingly, it is possible to restrain power consumption of the drug dispensing device. Therefore, the piezoelectric drive device 10 is particularly effective when the drug dispensing device is driven by a battery.

G. Modification Example:

Without being limited to the above-described examples or embodiments, the invention can be embodied in various aspects within the scope not departing from the gist of the invention. For example, the invention can also be modified as follows.

(1) According to the above-described embodiments, an example has been described in which the piezoelectric substance formed through the film forming process is used as the piezoelectric element. However, the piezoelectric substance may be a piezoelectric substance in bulk.

(2) According to the above-described embodiments, a configuration in which the vibrating body 210 is supported to be capable of vibrating by the connection portions 230 which respectively extend one by one from the right and left long sides of the vibrating body 210 has been described as an example. However, without being limited thereto, the arrangement position or the number of the connection portions 230 can employ various arrangement positions or any desired number. For example, a configuration may be adopted in which the vibrating body 210 is supported to be capable of vibrating by the connection portions 230 in which every two or more connection portions 230 respectively extend from the right and left long sides of the vibrating body 210. In addition, a structure may be employed which supports the vibrating body 210 in a cantilever state by disposing a connection portion on only one side extending along the longitudinal direction. In addition, a structure may be employed which supports the vibrating body 210 in a cantilever state by disposing a connection portion on the short side opposite to the contact portion 20 of the vibrating body 210.

(3) According to the above-described embodiments, a case where the impedance characteristic is measured as the respective frequency characteristics of the plurality of piezoelectric vibrating portions and the respective resonance frequencies are obtained based on the measured impedance characteristic has been described as an example. However, without being limited thereto, various frequency characteristics such as current characteristics and voltage characteristics can be measured and the respective resonance frequencies can be obtained from the measured frequency characteristics.

Without being limited to the above-described embodiments, examples, or modification examples, the invention can be realized by various configurations within the scope not departing from the gist of the invention. For example, in order to partially or entirely solve the above-described problems, or in order to partially or entire achieve the above-described advantageous effects, technical features in the embodiments, examples, or modification examples corresponding to technical features in each aspect described in the Summary can be appropriately replaced or combined with each other. In addition, if the technical features are not described herein as essential, the technical features can be appropriately deleted.

The entire disclosure of Japanese Patent Application No. 2015-135776, filed Jul. 7, 2015 is expressly incorporated by reference herein.

What is claimed is:

1. A piezoelectric drive device comprising:
    a driven member; and
    a plurality of piezoelectric vibrators configured to drive the driven member,
    wherein a first piezoelectric vibrator among the plurality of piezoelectric vibrators is configured to vibrate at a maximum resonance frequency, and a resonance frequency of a longitudinal primary vibration and a resonance frequency of an in-plane bending secondary vibration are the same in the first piezoelectric vibrator,
    a second piezoelectric vibrator among the plurality of piezoelectric vibrators is configured to vibrate at a minimum resonance frequency, and a resonance frequency of the longitudinal primary vibration and a resonance frequency of the in-plane bending secondary vibration are the same in the second piezoelectric vibrator, and
    a difference between the maximum resonance frequency and the minimum resonance frequency falls within a range of 0.001% to 5% of an average resonance frequency of the plurality of piezoelectric vibrators.

2. The piezoelectric drive device according to claim 1,
    wherein the difference between the maximum resonance frequency and the minimum resonance frequency falls within a range of 0.003% to 5% of the average resonance frequency.

3. The piezoelectric drive device according to claim 2,
    wherein the difference between the maximum resonance frequency and the minimum resonance frequency falls within a range of 0.1% to 5% of the average resonance frequency.

4. The piezoelectric drive device according to claim 3,
    wherein the difference between the maximum resonance frequency and the minimum resonance frequency falls within a range of being greater than 1% and equal to or smaller than 5% of the average resonance frequency.

5. The piezoelectric drive device according to claim 1,
    wherein the plurality of piezoelectric vibrators are all integrated into a single piezoelectric vibrating unit.

6. The piezoelectric drive device according to claim 1, further comprising:
    a plurality of piezoelectric vibrating units configured to drive the driven member,
    wherein each of the plurality of piezoelectric vibrating units has a sub-group of the plurality of piezoelectric vibrators, and at least two piezoelectric vibrators in the plurality of piezoelectric vibrators are integrated together to form a single member.

7. The piezoelectric drive device according to claim 1, wherein each of the plurality of piezoelectric vibrators includes:
   a vibrating plate;
   a piezoelectric element disposed on the vibrating plate, the piezoelectric element being configured with a first electrode, a second electrode, and a piezoelectric substance located between the first electrode and the second electrode; and
   a contact member disposed on at least one of the vibrating plate or the piezoelectric element, the contact member being directly contacted with the driven member.

8. The piezoelectric drive device according to claim 7, wherein a thickness of the piezoelectric substance is in range of 50 nm to 20 μm.

9. A robot comprising:
   a plurality of links;
   a joint that connects two adjacent links of the plurality of links; and
   the piezoelectric drive device according to claim 1,
   wherein the two adjacent links of the plurality of links pivot at the joint via the plurality of piezoelectric vibrators.

* * * * *